(12) United States Patent
Chien et al.

(10) Patent No.: US 10,962,846 B2
(45) Date of Patent: Mar. 30, 2021

(54) DISPLAY DEVICE

(71) Applicant: AU OPTRONICS CORPORATION, Hsin-Chu (TW)

(72) Inventors: Chih-Wei Chien, Hsin-Chu (TW); Li-Wei Tseng, Hsin-Chu (TW); Shau-Yu Tsai, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/655,512

(22) Filed: Oct. 17, 2019

(65) Prior Publication Data

US 2020/0292860 A1 Sep. 17, 2020

(30) Foreign Application Priority Data

Mar. 12, 2019 (TW) ................................. 108108269

(51) Int. Cl.
 *G02F 1/1333* (2006.01)
 *G02F 1/1345* (2006.01)
(52) U.S. Cl.
 CPC ...... *G02F 1/1345* (2013.01); *G02F 1/133308* (2013.01); *G02F 2202/28* (2013.01)
(58) Field of Classification Search
 CPC .......... G02F 2001/13332; G02F 2001/133314; G02F 1/133308; G02F 2202/28
 See application file for complete search history.

(56) References Cited

U.S. PATENT DOCUMENTS

| | | | |
|---|---|---|---|
| 6,954,243 B2 | 10/2005 | Ota et al. | |
| 2009/0185100 A1* | 7/2009 | Matsuhira | G02B 6/005 349/58 |
| 2009/0322214 A1 | 12/2009 | Lee et al. | |
| 2012/0120364 A1 | 5/2012 | Wu et al. | |
| 2015/0185527 A1 | 7/2015 | Chang | |
| 2017/0038632 A1 | 2/2017 | Hsu et al. | |
| 2017/0205659 A1* | 7/2017 | Chien | G02F 1/133528 |
| 2018/0157093 A1* | 6/2018 | Jang | G02B 6/0093 |
| 2018/0292687 A1 | 10/2018 | Jeon et al. | |

(Continued)

FOREIGN PATENT DOCUMENTS

| | | |
|---|---|---|
| CN | 102393579 A | 3/2012 |
| CN | 102455563 A | 5/2012 |

(Continued)

OTHER PUBLICATIONS

IPOS has issued the Office Action for the corresponding Singapore application dated Jul. 3, 2020.

*Primary Examiner* — Edmond C Lau
*Assistant Examiner* — Mariam Qureshi
(74) *Attorney, Agent, or Firm* — WPAT, PC

(57) ABSTRACT

A display device including a display panel, a film, a flexible connecting unit, a first glue, and a second glue. The film is stacked on an outer surface of the display panel and has an extension portion extending out of the outer surface. The flexible connecting unit connects to the display panel and extends out from a first end of the display panel. A gap exists between the flexible connecting unit and the extension portion while the first glue is at least partially distributed within the gap. The second glue at least partially distributed between the flexible connecting unit and the edge of the first end, and the second glue is different from the first glue.

18 Claims, 4 Drawing Sheets

(56) References Cited

U.S. PATENT DOCUMENTS

2019/0219863 A1\* 7/2019 Tezen ................. G02F 1/00
2019/0285933 A1   9/2019 Chien et al.

FOREIGN PATENT DOCUMENTS

| CN | 203449739   | 2/2014  |
|----|-------------|---------|
| KR | 20160075050 A | 6/2016 |
| TW | 092113738   | 12/2004 |
| TW | I242669     | 11/2005 |
| TW | I272417     | 2/2007  |
| TW | I281082     | 5/2007  |
| TW | I588571     | 6/2017  |

\* cited by examiner

DISPLAY DEVICE

BACKGROUND OF THE INVENTION

1. Field of the Invention

The present disclosure relates to a display device, in particular, to a display device having a film extending out of a display panel on the display panel.

2. Description of the Prior Art

In recent years, various types of display devices are already broadly used in our daily living. Things like televisions, personal computers, mobile phones, video games, and devices for cars all need to use display devices. In respect to technological development of display devices, there is a continual trend towards larger displays and the narrower frames, or even no frame, in an effort to give people a better visual experience.

In the pursuit of display devices with narrower frames or no frame, traditional designs continue to decrease the thickness of the outer frame of the device to achieve better visual effects. However, at the same time, thinner outer frames can't cover the outer surface of the display panel, as a result, users can easily be aware of the interface between the outer frame and the display panel. To decrease the aforesaid visual effects of the interface to the users, designs tend to decrease the distance between the edge of the display panel and the outer frame. However due to the need to take into accounts an allowed difference in assembly and the fact that the outer frame might be subject to external force and press upon the display panel, a certain gap is still required to be keep a distance between the outer filter and the edge of the display panel. But because of existence of the gap, users may see the elements or circuits within the display device through the gap, affecting the quality of product appearance. In addition, the light in the display device may also pass through this gap and leak out to produce a light leak.

SUMMARY OF THE INVENTION

An object of the present disclosure is to provide a display device which decreases the opportunity that elements in the display device are seen by users.

An object of the present disclosure is to provide a display device, having a better visual appearance.

An object of the present disclosure is to provide a display device which provides a better support to a portion of a film protruding out of the display panels.

In an embodiment, a display device includes a display panel, a film, a flexible connecting unit, a first glue and a second glue. The display panel has an outer surface and a first end, and a film is partially stacked on the outer surface. In addition, the film further has an extension portion extending out of the outer surface. The end of the flexible connecting unit connects to the display panel and extends out from the first end. A gap exists between the flexible connecting unit and the extension portion, and the first glue is at least partially distributed within the gap. The second glue is at least partially distributed between the flexible connecting unit and the edge of the first end, and the second glue is different from the first glue. Through this disposition, the first glue may provide a support to the outer surface of the film, and the second glue may also provide the region between the flexible connecting unit and the display panel with a cushion to decrease the risk of the flexible connecting unit collapsing.

In another embodiment, the display device has a display panel, a film, and a first glue. The film is partially stacked on the outer surface of the display panel, and has an extension portion extending out of the outer surface. The first glue is distributed along the first end, and positioned in the inner side of the extension portion. The first glue is away from the edge of the first end to form a step structure and has a first step and a second step; wherein the first step is closer to the film than the second and extends out of the second step.

DETAILED DESCRIPTION OF THE PREFERRED EMBODIMENT

Figure 1:
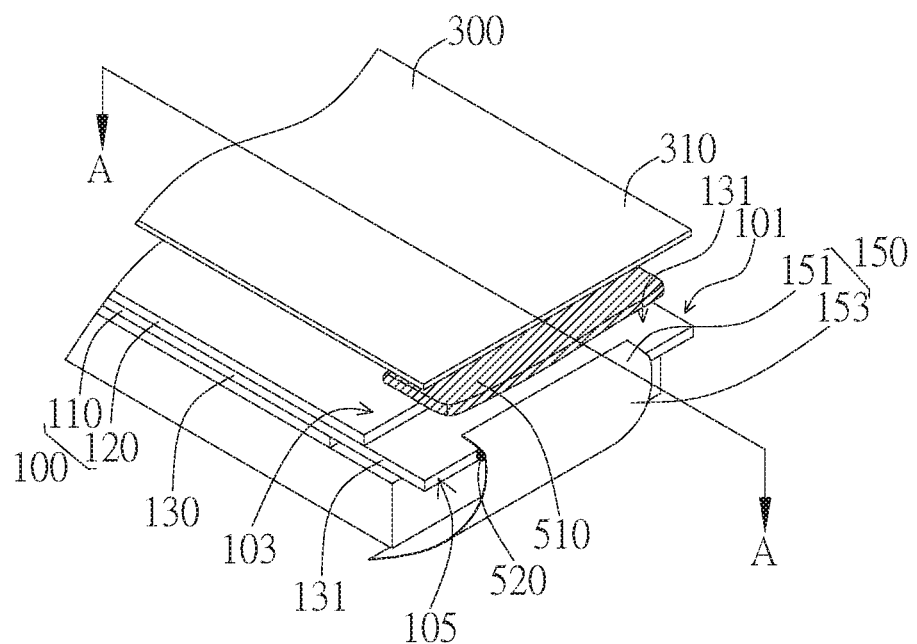
FIG. 1 is an exploded view of the elements of the display device

The connecting elements according to the present invention will be described in detail below through embodiments and with reference to the accompanying drawings, a person having ordinary skill in the art may understand the advantages and effects of the present disclosure through the contents disclosed in the present specification. However, the contents shown in the following sentences never limit the scope of the present disclosure. Without departing from the conception principles of the present invention, a person having ordinary skill in the present art may realize the present disclosure through other embodiments based on different views and applications. In the attached FIGs, for the purpose of clarification, the thicknesses of layers, films, panels, regions and the like are amplified. In the whole specification, the same marks represent the same element. It should be understood that, when an element such as a layer, a film, a panel, a region or a substrate are described as "being on" or "being connected to" another element, they may be directly on or connected to another element, or there may be other elements therebetween. On other hands, when an element is described as "directly exists on another element" or "directly connects to" another element, there is no element therebetween. As used in the present specification, a "connection" may be a physical and/or electrical connection. In addition, an "electrical connection" or "coupling" means that other elements may exist therebetween.

It should be understood that, even though the terms such as "First", "Second", "Third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

In addition, relative terms such as "lower" or "bottom" and "on" or "top" may be used to describe the relationship between an element and another element in the present specification, as shown in the FIGs. It should be understood that, the purpose of using relative terms is to include the different directions of the devices not shown in the FIGs. For example, if a device in an attached FIG is turned upside down, an element described as being "under" another element will be "on top of" that element. Therefore, a descriptive term "under" may include the meaning of both "under" and "on top of", depending on the specific orientation of the attached FIG.

The terms "about", "approximate" or "essentially" used in the present specification include the value itself and the average values within the acceptable range of deviation of the specific values confirmed by a person having ordinary skill in the present art, considering the specific measurement discussed and the amount of errors related to such measurement (that is, the limitation of the measurement system). For example, "about" may mean within one or more standard deviations of the value itself, or within ±30%, ±20%, ±10%, ±5%. In addition, "about", "approximate" or "essentially" used in the present specification may select a more acceptable range of deviation or standard deviation based on optical property, etching property or other properties. One cannot apply one standard deviation to all properties.

FIG. 1 shows an embodiment of a display device. In the present embodiment, the display device includes a display panel 100, a film 300, a flexible connecting unit 150, a first glue 510 and a second glue 520. The display panel 100 is preferably a liquid crystal display (LCD) panel, but not limited thereto. It may also be an auto-luminescence display panel or other panels with other methods of display. The display panel 100 has an outer surface 103 and a first end 101; wherein the outer surface 103 is preferably a surface of the display panel 100 displaying the image outwardly. In the present embodiment, the first end 101 is in the side region of the display panel 100 disposed with the flexible connecting unit 150, which includes, but not limited to, the edge of the display panel 100 and the adjacent region thereof. For example, in an embodiment, the first end 101 refers to the side region of the display panel 100 which is disposed with the flexible connecting unit 150 and is outside of the visible area.

Figure 2:
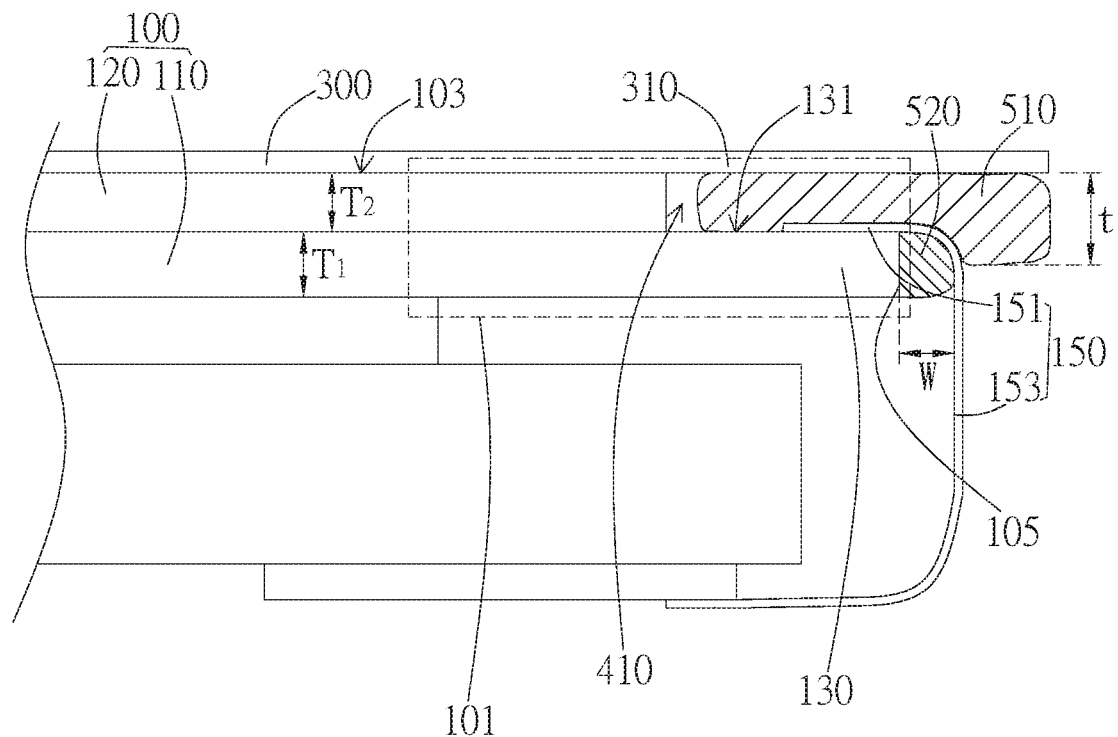
FIG. 2 is a sectional view of the embodiment shown in FIG. 1.

In the embodiment shown in FIG. 1, the display panel 100 includes a first substrate 110 and a second substrate 120. The first substrate 110 is preferably a pixel circuit substrate, on which a pixel electrode and a cable are disposed. The second substrate 120 is stacked on the first substrate 110, and the outer surface 103 is formed on a surface of the second substrate 120 opposite to the first substrate 110. A liquid crystal layer or an element with other properties may exist between the first substrate 110 and the second substrate 120 according to the method of display thereof. In the present embodiment, the second substrate 120 is preferably a color filter layer substrate on which a color filter layer may be disposed, corresponding to each pixel unit on the first substrate 110. As shown in FIG. 1 and FIG. 2, in the position of the first end 101 of display panel 100, the first substrate 110 has a protruding portion 130 which corresponds to the protruding portion of the second substrate 120. In other words, the first substrate 110 and the second substrate 120 are not lined up with each other at the first end 101, and the first substrate 110 protrudes with respect to the second substrate 120. However, in a different embodiment, the second substrate 120 may protrude with respect to the first substrate 110 at the first end 101, or they may be lined up at the first end 101.

As shown in FIG. 1 and FIG. 2, the protruding portion 130 has a protruding surface 131. In the present embodiment, the protruding surface 131 and the outer surface 103 face the same direction, and one edge of the flexible connecting unit 150 connects to the protruding surface 131. In the present embodiment, the flexible connecting unit 150 is formed by a flexible circuit board, on which a connecting line and/or a driving circuit may be disposed. As shown in FIG. 1, the flexible connecting unit 150 has a connecting portion 151 and a curved portion 153. The connecting portion 151 may include some pins and connects to the protruding surface 131, producing electrical connection to the circuits on the second substrate 120; The curved portion 153 connects to the connecting portion 151 and extends in the direction opposite to the protruding surface 131, such as the direction towards a surface opposite to the outer surface 103.

As shown in FIG. 1 and FIG. 2, the film 300 is at least partially stacked on the outer surface 103, and may be a polarized film, a protection film, an anti-reflection film, etc. The aforementioned "stacking" means that the film 300 has at least a partial overlap with the outer surface 103 in the direction of perpendicular projection; the two may be directly or indirectly glued on or stacked on. Preferably, the film 300 is glued onto the outer surface 103 by the glue layer. The layer 300 has another portion extending out of the outer surface 103 to form an extension portion 310. The extension portion 310 is stacked on the protruding portion 130 of the first substrate 110, and the two may not contact each other directly but have a gap 410 between them. In another embodiment, because the extension portion 310 extends out from the outer surface 103, the protruding surface 131 and/or the flexible connecting unit 150 are at least partially covered, resulting in enhanced visual appearance.

In addition, please refer to FIG. 1 and FIG. 2. The first glue 510 is at least partially distributed in the gap 410 and extends out of the first end 101, so that it is positioned between the flexible connecting unit 150 and the extension portion 310, or between the protruding surface 131 and the extension portion 310. More specifically, the first glue 510 is at least partially positioned between the connecting portion 151 and the extension portion 310. In the present disclosure, the first glue 510 has the form of a long string, and extends along the first end 101. However, in a different embodiment, the first glue 510 may also be distributed in a dashed line along the first end 101. Through this disposition, the first glue 510 may provide support to the extension portion 310 of the film 300, and make the extension portion 310 not be easily curved (towards the inside or towards the outside) or otherwise deformed.

As shown in FIG. 1 and FIG. 2, the second glue 520 is at least partially distributed on the side of the flexible connecting unit 150 opposite to the first glue 510, and positioned between the flexible connecting unit 150 and the edge 105 of the first end 101. In the present embodiment, because the first substrate 110 protrudes with respect to the second substrate 120, the edge 105 of the first end 101 is the edge of the protruding portion 131 of the first substrate 110. More specifically, the second glue 520 is at least partially positioned between the curved portion 153 and the edge 105. Through the disposition of the second glue 520, a cushion space or a cushion material may exist between the flexible connecting unit 150 and the edge 105 of the first end 101, which decreases the risk of the flexible connecting unit 150 collapsing at the first end 101. Preferably, in the cross-sectional view of the extending direction of the first end 101, as shown in FIG. 2, the width W of the second glue 520 between the flexible connecting unit 150 and the edge 105 ranges from 0.1 mm to 5 mm, so that the risk of collapsing can be decreased and the design requirement of reducing frame thickness can also be achieved.

In the present embodiment, the second glue 520 is different from the first glue 510. In other words, the different glues are respectively disposed on the two sides of the flexible connecting unit 150. In an embodiment, the hardness of the first glue 510 is higher than that of the second glue 520. For example, Shore hardness of the first glue 510 is A75 or more, and Shore hardness of the second glue 520 is A75 or less. Through this disposition, the first glue 510 with higher hardness may provide the extension portion 310 of the film 300 with a better support, and the second glue 520 with better flexibility may provide a better cushion effect between the flexible connecting unit 150 and the first end 101. In addition, in another embodiment, the first glue 510 is a light curable glue, such as an optical cement easily cured by UV, and the second glue 520 is a non-light curable glue, such as a moisture absorption glue and the like. Therefore, when UV is radiated on the first end 101 to cure the glue, the first glue 510 may be cured quickly because of light radiation. At that time, even if the second glue 520 is not able to receive complete light radiation, it may be cured because of its own properties, hence the situation of not curing completely may be decreased. In addition, before their curing, it is preferable for the first glue 510 to have better liquidity than the second glue 520, so that the first glue 510 can be more suitable for distribution in a large area, such as deep into the gap 410.

Figure 3:
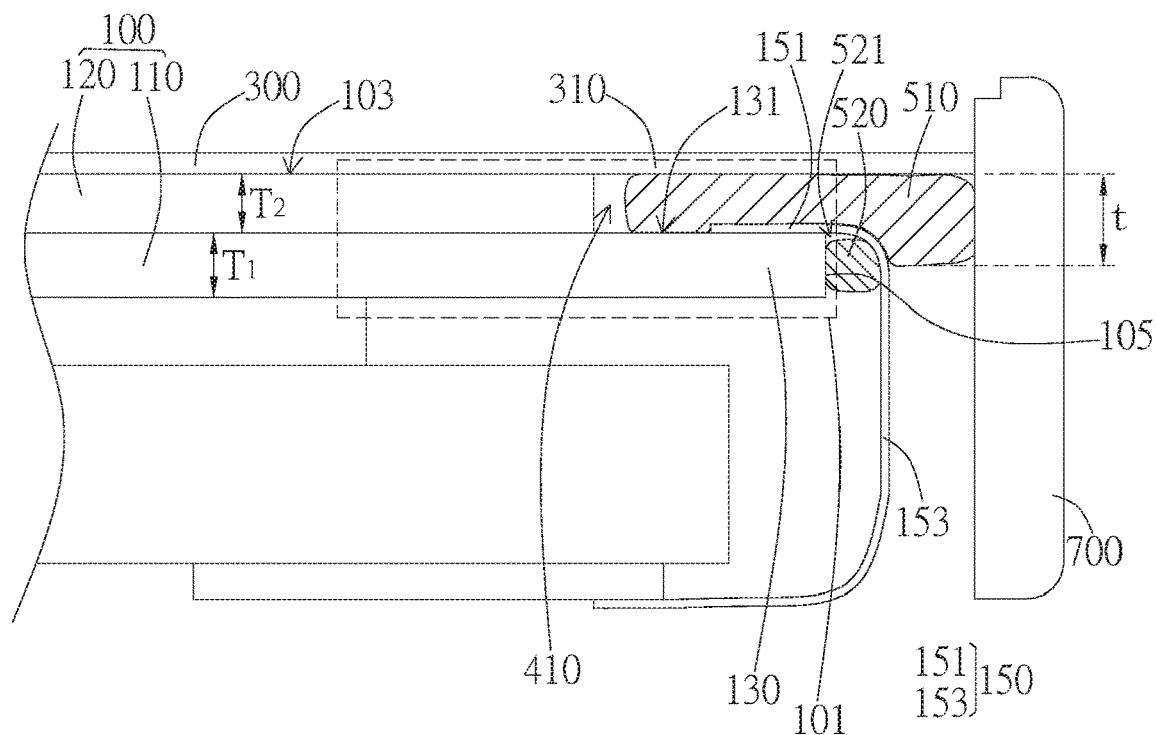
FIG. 3 is a sectional view of the display device in another embodiment.

In the embodiment shown in FIG. 3, the display device further includes a frame 700. The frame 700 is disposed corresponding to the first end 101. Preferably, the frame 700 may be an outer frame of the display device, but not limited thereto. In the present embodiment, the extension portion 310 of the film 300 might contact the frame 700 directly or after being pressed by outside force. Through the support of the first glue 510, the risk of deformation caused by the extension portion 310 being pressed is decreased. As further shown in FIG. 3, the hardness of the first glue 510 t is preferably larger than that of the second substrate 120 T2, but less than the total of the hardness of the first substrate 110 and the second substrate 120 T1+T2. Through this disposition, a sufficient supporting capability may be provided to the first glue 510, and the problem that the glue can't be easily cured because it is too thick may be reduced.

In addition, relative to the above embodiment, in the embodiment shown in FIG. 3, the second glue 520 may not completely fill the gap existing between the flexible connecting unit 150 and the protruding portion 130. As shown in FIG. 3, the flexible connecting unit 150, the protruding portion 130 (such as the protruding surface 131 or the edge 105) and the second glue 520 together define an air layer 521 therebetween. Through this disposition, the flexible connecting unit 150 may have a larger cushion space.

Figure 4:
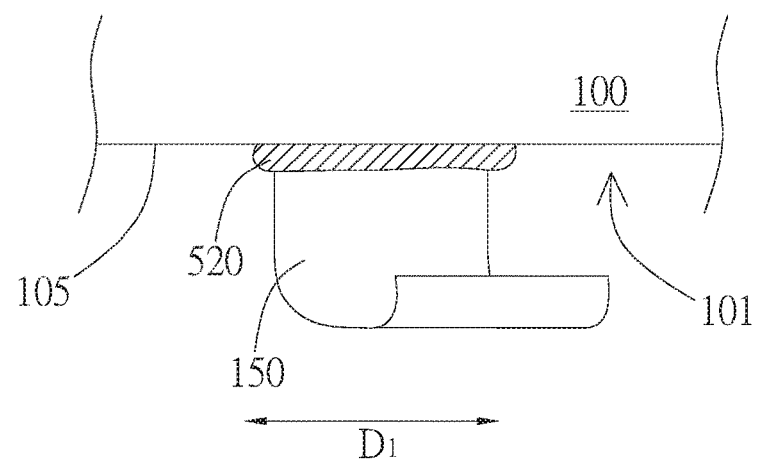
FIG. 4 is a schematic diagram of the display panel in an embodiment.

In the embodiment shown in FIG. 4, the second glue 520 extends to outside of the flexible connecting unit 150 at least partially along the extension direction of the first end 101 D1. In other words, the length of the second glue 520 along the extension direction D1 is larger than the width of the flexible connecting unit 150 along the same direction. Through this disposition, the risk of having the first glue 510 deep into the gap between the flexible connecting unit 150 and the edge 105 may be decreased, and the possibility of producing uncured first glue 510 may also decreased.

Figure 5:
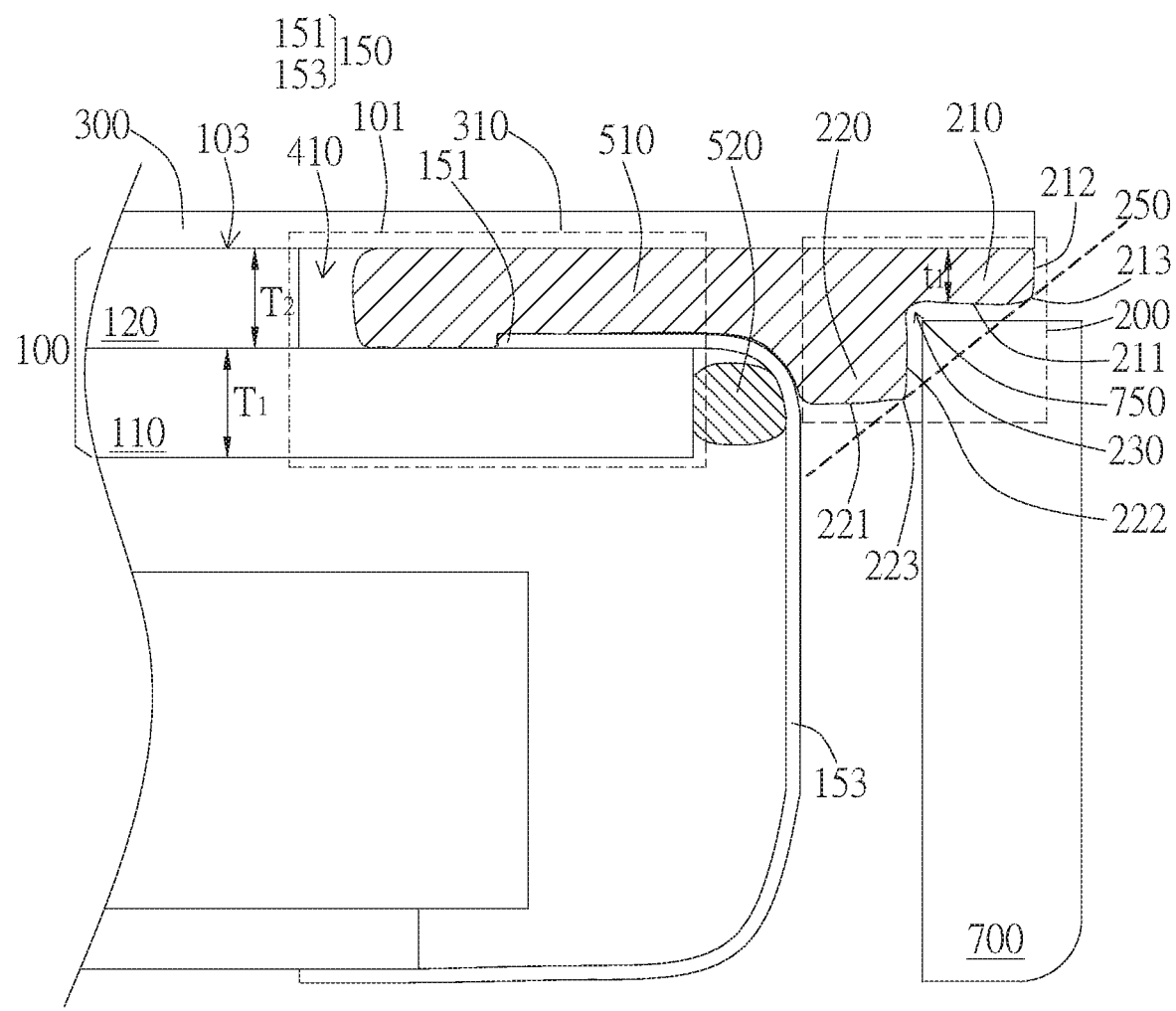
FIG. 5 is a sectional view of the display device in another embodiment.

FIG. 5 shows another embodiment of the display device. In the present embodiment, the first glue 510 forms a step structure 200 on an edge extending away from the first end 101 toward outside of the display panel 100. The step structure 200 extends along the first end 101 to form a long string, and has a first step 210 and a second step 220 which extend along the first end 101. As shown in FIG. 5, the first step 210 is closer to the film 300 than the second step 220, and the first step 210 extends out of second step 220 in the direction away from the first end 101. In the present embodiment, the thickness of the first step t1 is less than that of the second substrate 120 T2, to avoid having the overall step structure 200 too thick.

In the embodiment shown in FIG. 5, the display device further includes the frame 700. Similar to the above embodiment, the frame 700 is disposed corresponding to the first end 101. As shown in FIG. 5, the step structure 200 forms a groove 230 between the first step 210 and the second step 220, and a frame flange 750 of the frame 700 is opposite to the groove 230. In particular, the first step 210 has a first step surface 211 and a first step lateral surface 212. The second step 220 also has a second step surface 221 and a second step lateral surface 222. The first step surface 211 and the second step 222 are connected to each other, and they form the slot walls of the groove 230 and jointly form the groove 230. The connecting point of the first step surface 211 and the second step lateral surface 222 may form an angle of 90 degree between them or form a round corner, and the above-mentioned surface and edge preferably form a completely flat plane or a plane raised or curved a little, but not limited thereto. In addition, the frame flange 750 is preferably a portion forming a crest on the frame 700, such as the connecting point of an inner surface and a top. Preferably, the frame flange 750 is opposite to the groove 230, which means that the frame flange 750 is positioned within the range hold by the extension surface of both the first step surface 211 and second step lateral surface 222.

Figure 6:
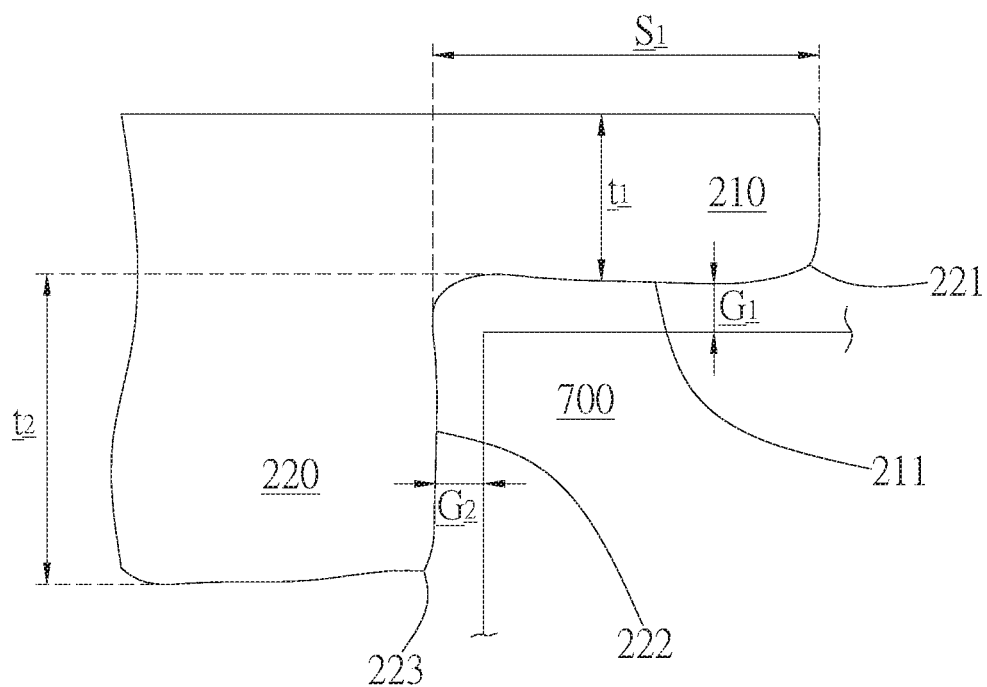
FIG. 6 is a partially amplified view of the embodiment shown in FIG. 5.

In the embodiment shown in FIG. 5, the first step surface 211 forms the first step edge 213 on the side away from the second step lateral surface 222; the second step lateral surface 222 forms the second step edge 223 on the side away from the first step surface 211. As shown in FIG. 5, the first step edge 213 is the crested portion between the first step surface 211 and the first step lateral surface 212. The second step edge 223 is the crested portion between the second step surface 221 and the second step lateral surface 222. Please note that, the first step edge 213 and the second step edge 223 may be a ridge line or a ridge with a round corner section. The first step edge 213 and the second step edge 223 together form a virtual plane 250, and the frame flange 750 extends into the virtual plane 250. Please note that, the virtual plane 250 is a plane not actually existing in the space, but is an imagined surface passing through the first step edge 213 and the second step edge 223, for the purpose of describing the relationships between the directions and spaces. As shown in an amplified view of FIG. 6, if the perpendicular distance between the first step edge 213 and the frame 700 is defined to be G1, the perpendicular distance between the second step edge 223 and the frame 700 is defined to be G2, the length of the first step surface 211 is defined to be S1, and the thickness of the second step 220 is defined to be t2, then they should preferably satisfy the following relationship:

$$\frac{t_2 - G_1}{G_2} \geq \frac{G_1}{S_1 - G_2}$$

Through the above designs, the opportunity of the user seeing the inner structure from the space between the frame 700 and the display panel 100 may be decreased, and the opportunities of light leaking out from the inner side of the display device may be decreased also.

Figure 7:
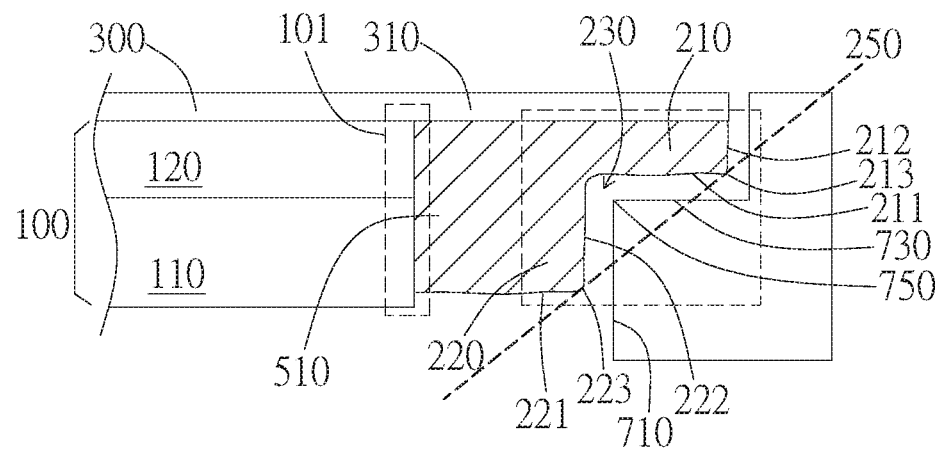
FIG. 7 is a sectional view of the display device in another embodiment.

FIG. 7 shows another embodiment of the display device, the display panel 100 has no protruding portion in the first end 101; that is, the first substrate 110 and the second substrate 120 are lined up. In addition, in this embodiment, the first end 101 may also not have a flexible connecting unit. At the same time the first glue 510 is distributed along the first end 101 and positioned in the inside of the extension portion 310 of the film 300, and also has the step structure 200. The frame 700 has an inner surface 710 and a top surface 730 to form the frame flange 750 opposite to the groove 230 at the location that the inner surface 710 and the top surface 730 are connected. However, in a different embodiment, the display device may not have the frame 700, and other elements may be disposed to work with the groove 230.

The present disclosure was described by the abovementioned embodiments in detail, however the abovementioned embodiments merely represent the examples of this disclosure. Please note that, the exposed embodiments never limit the scope of the present disclosure thereto. On the contrary, various equipment changes, alternations or modifications based on the claims of the present disclosure are all viewed as being embraced by the scope of the present disclosure.

What is claimed is:

1. A display device, comprising:
   a display panel having an outer surface and a first end;
   a film partially stacked on the outer surface, the film having an extension portion extending out of the outer surface;
   a flexible connecting unit connected to the display panel and extending out from the first end, wherein a gap exists between the flexible connecting unit and the extension portion;
   a first glue at least partially distributed within the gap and extending out of the first end; and
   a second glue at least partially distributed on one side of the flexible connecting unit opposite to the first glue and between the flexible connecting unit and an edge of the first end, wherein the second glue is different from the first glue,
   wherein the hardness of the first glue is larger than that of the second glue, and
   wherein Shore hardness of the first glue is A75 or more; Shore hardness of the second glue is A75 or less.

2. The display device according to claim 1, wherein on a cross-section perpendicular to an extending direction of the first end, a width of the second glue between the flexible connecting unit and the edge of the first end has a maximum ranging from 0.1 mm to 5 mm.

3. The display device according to claim 1, wherein the second glue at least partially extends outside the flexible connecting unit along an extending direction of the first end.

4. The display device according to claim 1, wherein one end of the first glue away from the first end has a step structure comprising a first step and a second step extending along the first end; the first step is closer to the film than the second step and extends out from the second step.

5. The display device according to claim 4, wherein the display panel comprises a first substrate and a second substrate stacked with each other, wherein the second substrate is closer to the film than the first substrate; a thickness of the first step is less than that of the second substrate.

6. The display device according to claim 4, further comprising a frame disposed corresponding to the first end of the display panel, wherein the first step has a first step surface, the second step has a second step lateral surface connected to the first step surface with a groove formed therebetween, and the frame has a frame flange corresponding to the groove.

7. The display device according to claim 6, wherein the first step surface has a first step edge away from the second step lateral surface; the second step lateral surface has a second step edge away from the first step surface; the frame flange extends to a virtual plane defined by the first step edge and the second step edge.

8. The display device according to claim 1, wherein the display panel comprises:
   a first substrate; and
   a second substrate positioned on the first substrate and stacked with the first substrate;
   the outer surface is formed on a surface of the second substrate opposite to the first substrate, wherein at the first end of the display panel, the first substrate has a protruding portion protruding with respect to the second substrate; the protruding portion has a protruding surface facing the extension portion;
   wherein the flexible connecting unit has a connecting portion, the connecting portion is connected to the protruding surface, the connecting portion is positioned between the protruding surface and the extension portion, and the first glue is at least partially distributed between the connecting portion and the extension portion.

9. The display device according to claim 8, wherein the flexible connecting unit has a curved portion; the curved portion is connected to the connecting portion and extends away from the film; the second glue is at least partially positioned between the curved portion and an edge of the protruding portion.

10. The display device according to claim 8, wherein the thickness of the first glue is larger than that of the second substrate, but less than a total thickness of the first substrate and the second substrate.

11. The display device according to claim 8, wherein the flexible connecting unit, the protruding portion, and the second glue together define an air layer.

12. The display device according to claim 1, wherein the first glue is a light curable glue, and the second glue is a non-light curable glue.

13. A display device, comprising:
   a display panel having an outer surface and a first end;
   a film partially stacked on the outer surface, the film having an extension portion extending out of the outer surface; and
   a first glue distributed along the first end and positioned on an inner side of the extension portion; and
   a second glue at least partially distributed on one side of a flexible connecting unit opposite to the first glue and between the flexible connecting unit and an edge of the first end,
   wherein the second glue is different from the first glue,
   wherein the hardness of the first glue is larger than that of the second glue, and wherein Shore hardness of the first glue is A75 or more; Shore hardness of the second glue is A75 or less, wherein one end of the first glue away from the first end has a step structure comprising a first step and a second step extending along the first end; the first step is closer to the film than the second step and extends out from the second step.

14. The display device according to claim 13, wherein the display panel comprises a first substrate and a second substrate stacked with each other, wherein the second substrate is closer to the film than the first substrate; a thickness of the first step is less than that of the second substrate.

15. The display device according to claim 14, wherein the first substrate has a protruding portion protruding with respect to the second substrate; the protruding portion has a protruding surface facing the extension portion; the first glue is at least partially distributed between the extension portion and the protruding surface.

16. The display device according to claim 13, further comprising a frame disposed corresponding to the first end of the display panel, wherein the first step has a first step surface, the second step has a second step lateral surface connected to the first step surface with a groove formed therebetween, and the frame has a frame flange corresponding to the groove.

17. The display device according to claim 16, wherein the first step surface has a first step edge away from the second lateral surface; the second lateral surface has a second step edge away from the first step surface; the frame flange extending to a virtual plane defined by the first step edge and the second step edge.

18. A display device comprising:
a display panel having an outer surface and a first end;
a film partially stacked on the outer surface, the film having an extension portion extending out of the outer surface;
a flexible connecting unit connected to the display panel and extending out from the first end, wherein a gap exists between the flexible connecting unit and the extension portion;
a first glue at least partially distributed within the gap; and
a second glue at least partially distributed on one side of the flexible connecting unit opposite to the first glue and between the flexible connecting unit and an edge of the first end, wherein the second glue is different from the first glue,
wherein the hardness of the first glue is larger than that of the second glue, and Shore hardness of the first glue is A75 or more; Shore hardness of the second glue is A75 or less.

* * * * *